United States Patent [19]

Kanazawa et al.

[11] 4,282,551
[45] Aug. 4, 1981

[54] PCM RECORDING AND REPRODUCING APPARATUS

[75] Inventors: Yasunori Kanazawa, Hachioji; Takao Arai, Yokohama; Norio Yokozawa, Fuchu; Wasao Takasugi, Higashiyamato, all of Japan

[73] Assignee: Hitachi, Ltd., Tokyo, Japan

[21] Appl. No.: 138,275

[22] Filed: Apr. 9, 1980

[30] Foreign Application Priority Data

Apr. 11, 1979 [JP] Japan .................................. 54/43053
Feb. 20, 1980 [JP] Japan .................................. 55/19034

[51] Int. Cl.³ .......................... G11B 5/00; G11B 5/09
[52] U.S. Cl. ......................................... 360/32; 360/53
[58] Field of Search ...................... 360/53, 32; 371/47, 371/61

[56] References Cited

U.S. PATENT DOCUMENTS 3,832,684  8/1974  Besenfelder ............................. 371/61
4,202,018  5/1980  Stockham, Jr. .......................... 360/53
4,211,997  7/1980  Rudnick et al. ......................... 360/53

Primary Examiner—Vincent P. Canney
Attorney, Agent, or Firm—Craig and Antonelli

[57] ABSTRACT

When error detection codes are added to a sampled signal word which is a digital version of audio information and a control signal which is a digital version of system control information to construct a data frame and a control signal frame, respectively, the error detection code for the data frame is generated under an arithmetic condition different from that for the control signal frame. In this manner, frame identification information is superimposed on the error detection codes. In a reproducing unit, the error detection codes containing the identification information are used to check an error in the reproduced sampled signal word and control signal and to effect the discrimination between the data frame and the control signal frame.

7 Claims, 12 Drawing Figures

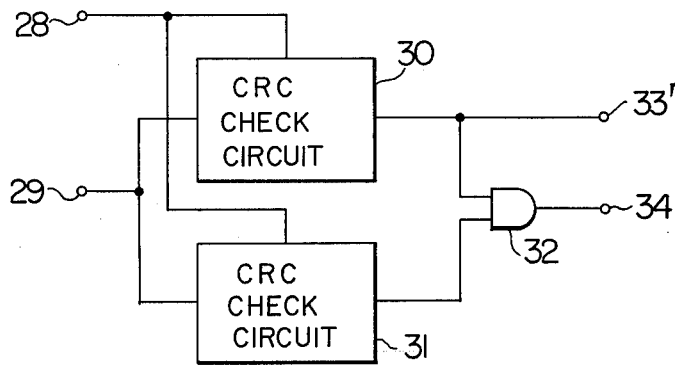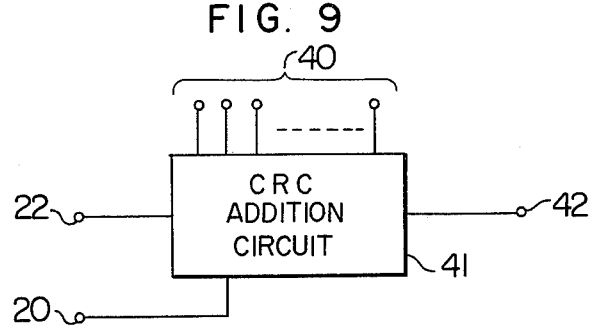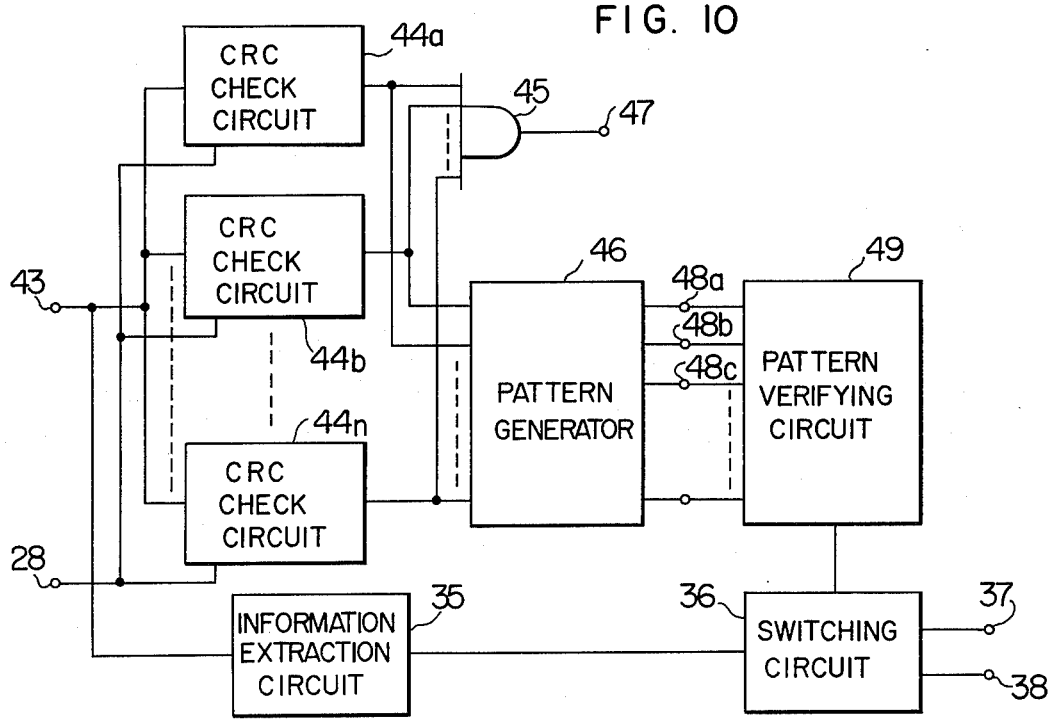

PCM RECORDING AND REPRODUCING APPARATUS

BACKGROUND OF THE INVENTION

1. Field of the Invention

The present invention relates to a PCM (Pulse Code Modulation) recording and reproducing apparatus in which an analog audio signal is converted to a digital signal and recorded in the form of digital signal and a reproduced digital signal is converted to the original analog audio-signal, and more particularly to a PCM recording and reproducing apparatus capable of distinguishing digital signals of different texts, that is, a digital signal which is a digitized version of the original audio information and a digital signal which is a digitized version of system control information for the PCM recording and reproducing apparatus, without adding redundancy and with a simple hardware.

2. Description of the Prior Art

Apparatus for converting an analog audio signal to a digital signal for recording has been well known as a PCM recorder. Information related to the analog audio signal to be recorded by the PCM recorder includes at least the following three information.

The first information is a coded word which represents amplitudes of the analog audio signal at predetermined time points by "1" or "0" binary digital representation. (Hereinafter, it is referred to as a sampled signal word.)

The second information is a frame synchronizing signal to specify a leading position of the sampled signal word block when a predetermined number of sampled signal words are assembled into a block called frame (hereinafter referred to as a data frame). It is inserted at the beginning or the end of the block.

The third information is an error detection code for detecting and handling a code error when it occurs in the sampled signal word due to the dropout which occurs during the recording and reproducing of the PCM recorder. The error detection code is needed because the error code is recognized as a noise as it has no connection with the original audio signal.

In the error detection of the digital signal, the word-by-word parity checking is usually used. Recently, the cyclic redundancy check code (hereinafter referred to as CRC) having a high probability of error detection has been widely used.

The information to be recorded in the PCM recorder basically includes three information described above, that is, the sampled signal words which are digital version of the analog audio signal, the frame synchronizing signals and the error detection code such as CRC. Practically, a coded control signal is additionally required. The control signal is not directly related to the audio information but it is included for the purpose of system control to render the PCM recording and reproducing apparatus easier to use. Examples of the control signal are address signals inserted at a predetermined interval to render the edition easier or to indicate the beginning of music, identification code for identifying the presence or absence of preemphasis, and identification code for the recorded texts.

Heretofore, the control signal was recorded for each data frame, or when a video signal is recorded in the PCM recorder, the control signals were inserted in group for each vertical synchronizing signal of a television composition synchronizing signal. Several tens bits or more are necessary to record the control signals while the number of bits in the frame is in the order of 100 bits for the PCM recording. Accordingly, the control signals may need a space comparable to one frame. In addition, the control signals need not be inserted too frequently from the purpose thereof and the lower frequency of insertion thereof is rather desirable because a necessary band width for recording can be reduced. When the control signal frame is inserted for every plurality of data frames, it is necessary to distinguish the data frame from the control signal frame. Like the data frame, the control signal frame includes the frame synchronizing signal and the error correction code such as CRC.

Thus, in the PCM recorder, the control signal is inserted in one horizontal scan section immediately following to the vertical synchronizing signal of the composite synchronizing signal. In a storage device of a computer, the control signal is recorded at a preassigned position relative to a reference position. In the PCM recorder which does not record the vido signal, however, it is necessary to specify the beginning of data (BOD) and the end of data (EOD) as is the case of the compuer storage device. This is not desirable because it results in the increase of the reducancy in the recording and complex processing by hardware because of the frequent need for the determination of the EOD and the BOD.

SUMMARY OF THE INVENTION

It is an object of the present invention to provide a PCM recording and reproducing apparatus which overcomes the disadvantages of the prior art described above and can discriminate between the audio signal and the control signal without increasing the transmission rate or recording density.

In accordance with the present invention, based on the fact that both the data frame and the control signal frame include the error detection codes such as CRC, the identification codes for the data frame and the control signal frame are superimposed on the error detection codes for the data frame and the control signal frame when they are generated at the recording unit by generating the error detection code for the data frame under an arithmetic condition different from that for the control code frame, and in the reproducing unit, the error is checked by the reproduced error detection codes containing the identification information and the distinction between the data frame and the control signal frame is simultaneously effected.

In accordance with the present invention, the identification information superimposed on the error detection codes can be used as a control signal separate from the control signal of the control signal frame. Accordingly, a high efficiency recording is attained with a low redundancy.

BRIEF DESCRIPTION OF THE DRAWINGS

FIGS. 7 and 8 show block diagrams of a recording unit and a reproducing unit, respectively, of a third embodiment of the present invention.

FIGS. 9 and 10 show block diagrams of a recording unit and a reproducing unit, respectively, of a fourth embodiment of the present invention.

DETAILED DESCRIPTION OF THE PREFERRED EMBODIMENTS

Figure 1:
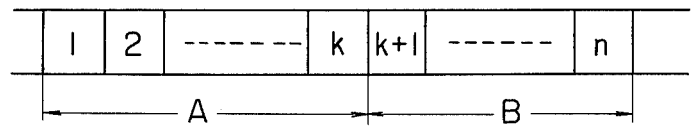
FIG. 1 shows a code format of CRC.

Referring to FIG. 1, the CRC code format constitutes one frame by two fields, information bit field A and check bit field B. The information bit field A contains the sampled signal word for the data frame, on the control signal for the control signal frame. Assuming that the number of bits in the information bit field A is equal to k and the total number of bits of the frame is equal to n, (n-k) bits are used for the check bit field B, that is, for the error detection code. In the CRC, a specific code sequence called a (n-k) order generator polynomial is used to generate the code of the check bit field B. The polynomial represents the bits in the information bit field A with variables x. The order of the generator polynomial is determined by the (n-k) bits in FIG. 1 and it is fixed depending on a particular system to which it is applied.

The polynomial for the check bit field B is derived from the polynomial $M(x)$ for the information bit field A in FIG. 1 in the following manner: The polynomial $M(x)$ for the information bit field A is multiplied by $x^{n-k}$ corresponding to the order of the generator polynomial $G(x)$, and the product is divided by the generator polynomial $G(x)$. The resulting quotient $Q(x)$ is represented by;

$$x^{n-k} \cdot M(x) = Q(x) \cdot G(x) + R(x) \tag{1}$$

where $R(x)$ is a remainder. The code format shown in FIG. 1 is defined by a polynomial $P(x)$ which is a sum of the $x^{n-k} \cdot M(x)$ and $R(x)$ in the formula (1). When this polynomial $P(x)$ is recorded, a polynomial $S(x)$ for the signal reproduced at the reproducing unit may include error and it is represented by;

$$S(x) = P(x) + E(x) \tag{2}$$

where $E(x)$ is a polynomial for the error portion. From the formula (1), the recorded code sequence can be represented by;

$$P(x) = x^{n-k} \cdot M(x) + R(x) = Q(x) \cdot G(x) \tag{3}$$

Accordingly, if the reproduced code $S(x)$ can be divided by the generator polynomial without a remainder, $E(x)$ is equal to zero and no error exists. In this manner, in the CRC, the same generator polynomial $G(x)$ is used for processing in the recording unit and the reproducing unit.

Figure 2:
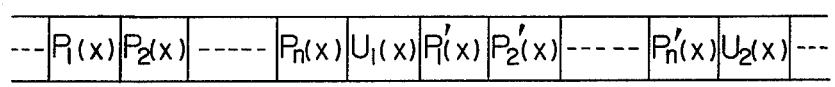
FIG. 2 shows an example of a frame format in PCM recording.

FIG. 2 shows a format in which a control signal frame is inserted for every fixed number of data frames. In FIG. 2, $P_1(x), P_2(x), \ldots, P_1'(x), P_2'(x), \ldots$ are data frames containing audio information, each frame having a format as shown in FIG. 1, and $U_1(x), U_2(x), \ldots$ are control signal frames each having a format as shown in FIG. 1, like the data frame. Since the data frames $P(x)$ and the control signal frames $U(x)$ are "0" and "1" binary coded signals, those frames must be clearly discriminated in order to correctly reproduce the information.

In accordance with the present invention, when the error detection codes for the data frame and the control signal frame are generated at the recording unit, the identification information of those frames are superimposed on the error detection codes by generating the error detection code for the data frame under an arithmetic condition different from that for the control signal frame, and in the reproducing unit, the error is checked by the reproduced error detection codes containing the identification information and the distinction between the data frame and the control signal frame is simultaneously effected. In the first embodiment, the above object is accomplished by using different generator polynomials in generating the CRC codes for the data frames $P(x)$ and the control signal frames $U(x)$.

In the code sequences shown in FIG. 2, two different code requences, that is, the code sequence for the data frame $P(x)$ and the code sequence for the control signal frame $U(x)$ are constructed as follows;

$$P(x) = Q(x) \cdot G(x) \tag{4}$$

$$U(x) = Q'(x) \cdot G'(x) \tag{5}$$

If the control signal frame $U(x)$ and the data frame $P(x)$ have the same number of bits, the generator polynomials $G(x)$ and $G'(x)$ are of the same order. Accordingly, if $G(x)$ is defined as;

$$G(x) = x^{16} + x^{12} + x^5 + 1 \tag{6}$$

then $G'(x)$ is to be a polynomial of the same order and different format, that is, $$G'(x) = x^{16} + x^{12} + x^3 + x + 1 \tag{7}$$

Other polynomial may be used for $G'(x)$ but it is desirable that $G'(x)$ is an irreducible polynomial in order to avoid erroneous decision in the process of division at the reproducing unit.

Figure 3:
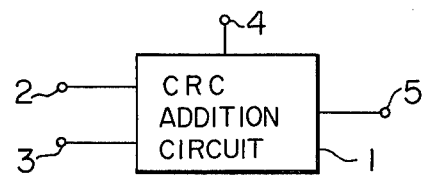
FIGS. 3 and 4 show block diagrams of a recording unit and a reproducing unit, respectively, of a first embodiment of the present invention.
Figure 4:
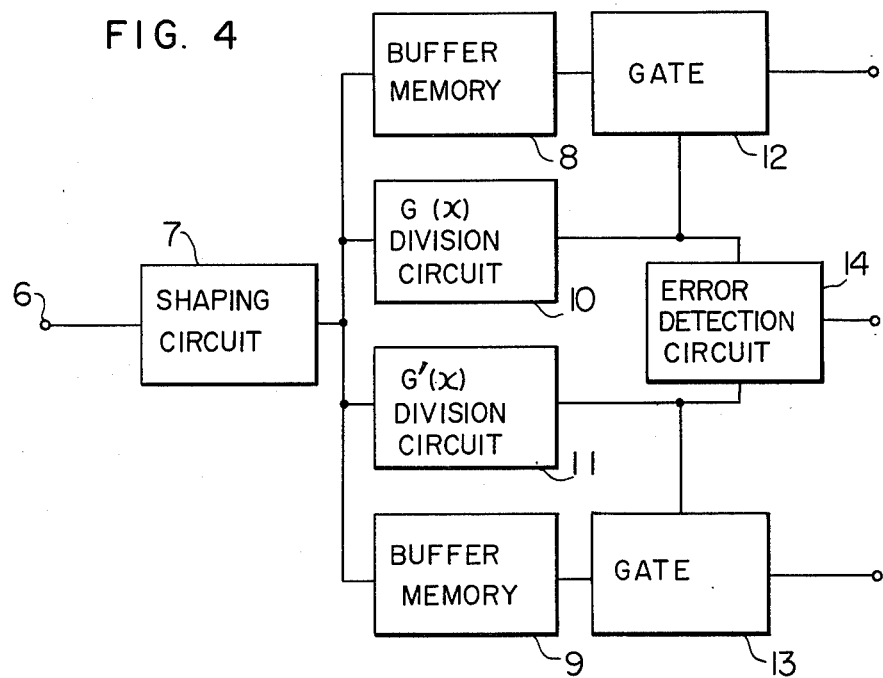

Referring to FIGS. 3 and 4, the first embodiment of the present invention which implement the principle described above will be explained. FIG. 3 shows a block diagram of a recording unit, in which a CRC addition circuit 1 comprises a shift register having the same number of bit positions as the number of order of the CRC generator polynomial $G(x)$, a feedback loop for $G(x)$, a shift register having the same number of bit positions as the number of order of the generator polynomial $G'(x)$, a feedback loop for $G(x)$ and an adder circuit. When a CRC is to be added to data received at an input terminal 2, all bits in the shift register are initially cleared and then one-frame data bits are loaded into the shift register bit by bit. The CRC bits which are the remainder in the shift register at the end of the arithmetic operation are added to the data bits and the sum is outputted from a terminal 5. Terminals 3 and 4 are a control signal input terminal and a data/control signal switching terminal, respectively. CRC bits are also added to the control signal in the same manner.

FIG. 4 shows a block diagram of a signal processing system of a reproducing unit in the first embodiment. A reproduced signal received at a terminal 6 is applied to a shaping circuit 7 which effects the bit synchronization and the wave shaping. The shaped signal is stored in buffer memories 8 and 9 and also applied to a $G(x)$ division circuit 10 and a G'(x) division circuit 11 which effect division operations.

By those division operations, the discrimination between the data frame and the control signal frame is made and either a gate 12 or a gate 13, as a case may be, is opened to send out the data or the contrl signal to a processing system. An algorithm used for the discrimination is shown below.

TABLE 1

| G(x) | G'(x) | DECISION |
|---|---|---|
| o | x | P(x) |
| x | o | U(x) |
| o | o | ERROR |
| x | x | |

If the result of the operation by the generator polynomial G(x) in the G(x) division circuit 10 is positive and the result of the operation by the generator polynomial G'(x) in the G'(x) division circuit 11 is error, the frame in question is the data frame P(x), and if the results are opposite to the above, the frame is the control signal frame U(x). If the results in both circuits are both positive or both error, the frame in question is a frame having code error. In this case, an error detectoin circuit 14 detect the error and sends an error detection signal to an error correction system.

In the illustrated embodiment, different CRC generator polynomials for error detection are used for the data frame and the control signal frame. Alternatively, a similar effect may be attained by using different contetns of the information polynomial M(x) of the formula (1) while using the same form of generator polynomial. More purticularly, for the dara frame, the information polynomial M(x) itself is used to effect the operation of the formula (1) to obtain the CRC, and for the control signal frame, a polynomial M'(x) containing a control signal portion and a frame synchronizing signal portion is used in place of the information polynomial M(x) to effect the operation of the formula (1) to obtain the CRC. The polynomial M'(x) is defined as follows;

$$M'(x) = M(x) + D(x) \quad (8)$$

where D(x) is a polynomial representing the frame synchronizing signal portion. Since the number of order of the polynomial M(x) used to obtain the CRC for the data frame is different from the number of order of the polynomial M'(x) for the control signal frame, there is no possibility that those two types of frames are confused. A circuit configuration for the above operation is similar to those shown in FIGS. 3 and 4 except that the G(x) division circuit 10 and the G'(x) division circuit 11 are replaced by an M(x) arithmetic operation circuit and an M'(x) arithmetic operation circuit, respectively.

Alternatively, a similar effect may be obtained when the CRC for the data frame is generated using the generator polynomial G(x) while the CRC for the control signal frame is generated using the polynomial M'(x) containing the frame synchronizing signal portion and the other generator polynomial G'(x).

Figure 5:
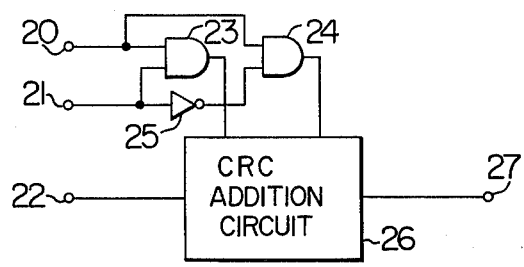
FIGS. 5 and 6 show block diagrams of a recording unit and a reproducing unit, respectively, of a second embodiment of the present invention.
Figure 6:
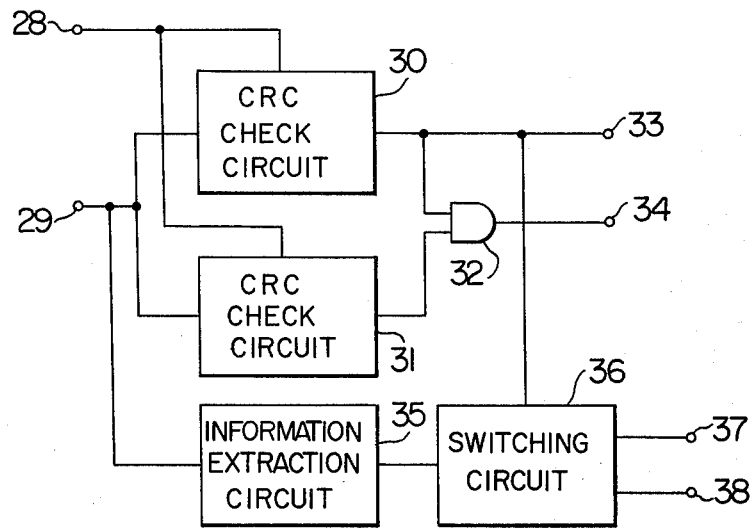

Referring now to FIGS. 5 and 6, a second embodiment of the present invention will be explained. In the second embodiment, the discrimination between a data frame consisting of a sampled signal word, which is a digital version of an analog audio signal, and a CRC, and a control signal frame consisting of a control signal and a CRC, is effected by generating those two CRC codes by establishing different initial conditions of arithmetic operation in the shift registers for the data frame and the control signal frame, and in the reproducing unit, finding out the above initial conditions by the arithmetic operation of the CRC to discriminate between the data frame and the control signal frame.

FIG. 5 shows a block diagram of a recording unit and FIG. 6 shows a block diagram of a reproducing unit. In the present embodiment, all CRC bits for the data frame are initially reset to "0" while all CRC bits for the control signal frame are initially set to "1." In the recording unit shown in FIG. 5, before the data bits are applied to a CRC addition circuit 26 through a data bit input terminal 22, an initialization pulse is supplied from an initialization pulse input terminal 20 to AND gates 23 and 24. The AND gate 23, at this time, receives an initial condition for the CRC arithmetic operation from an initial condition input terminal 21 while the AND gate 24 receives an inverted version of the initial condition through an inverter 25. The CRC addition circuit 26 includes a shift register having the same number of bit positions as the number of order of the CRC generator polynomial G(x), a feedback loop for G(x) and an adder circuit. An output terminal of the AND gate 23 is connected to a set terminal of the shift register while an output terminal of the AND gate 24 is connected to a reset terminal of the shift register. Thus, when the initial condition applied to the initial condition input terminal 21 is all-"1", the shift register of the CRC addition circuit 26 is set to all-"1," and if the initial condition is all-"0," the shift register is reset to all-"0." Thereafter, the data is applied from the data bit input terminal 22 to the CRC addition circuit 26 which effects the arithmetic operation to generate the CRC. Upon the completion of the entry of one block of data, the CRC bits are added to the data bits and they are outputted from a record signal output terminal 27 for recording.

In the reproducing unit shown in FIG. 6, before a reproduced signal consisting of the data bits and the CRC bits is received, an initialization pulse is applied from an initialization pulse input terminal 28 to CRC check circuits 30 and 31. As a result, the shift register in the CRC check circuit 30 is reset to all-"0" while the shift register in the CRC check circuit 31 is set to all-"1." Thereafter, the reproduced signal is applied to the CRC check circuits 30 and 31 through a reproduced signal input terminal 29, and the CRC check circuits 30 and 31 effect the CRC check operations. Upon the completion of the entry of the data bits and the CRC bits to the CRC check circuits 30 and 31, if no error has occurred during the transmission and the initial condition is all-"1," that is, if the CRC bits were added in the recording unit after the shift register of the CRC addition circuit 26 has been set to all-"1," the content of the shift register of the CRC check circuit 31 is all-"0" and it is applied to an AND gate 32. The content of the shift register of the CRC check circuit 30 is not all-"0" at this time because it was initialized to the initial condition of all-"0" which is different from the initial condition of all-"1" in the recording unit. Accordingly, the CRC check circuit 30 applies all-"1" output to the AND gate 32 and an initial condition output terminal 33. As a result, the AND gate 32 produces a "0" output at an error detection terminal 34.

On the other hand, if the initial condition is all-"0," that is, if the CRC bits were added in the recording unit after the shift register of the CRC addition circuit 26 has been reset to all-"0," the content of the shift register of the CRC check circit 31 is not all-"0" as opposed to the previous case and "1" signals are applied to the AND gate 32. The content of the shift register of the CRC check circuit 30 is all-"0" at this time and it applies a "0" output to the AND gate 32 and the initial condition output terminal 33. As a result, the AND gate 32 produces a "0" output at the error detectoin terminal 34.

Thus, if no error has occurred during the transmission, the output at the error detection terminal 34 is "0" and the initial condition output terminal 33 produces the initial condition that was established at the recording unit. If an error has occurred during the transmission, both of the contents of the shift registers of the CRC check circuits 30 and 31 are not all-"0" and the CRC check circuits 30 and 31 apply "1" outputs, respectively, to the AND gate 32. As a result, the error detection terminal 34 produces a "1" output to indicate the occurrence of error.

In the second embodiment, when the CRCXbits are added in the recording unit to the sampled signal word which is the digital version of the analog audio signal, the CRC bits are generated under the initial condition of all-"0" while the CRC bits to be added to the control signal are generated under the initial condition of all-"1." In the reproducing unit, the discrimination between the data frame and the control signal frame is effected by checking if the reproduced initial condition is all-"0" or all-"1." The reproduced signal from the reproduced signal input terminal 29 is supplied to an information extraction circuit 35 to extract only information signal which is free from the frame synchronizing signal. The extracted information signal is then applied to a switching circuit 36 which, under the control of the initial condition, provides the discriminated information signal to a sampled signal word output terminal 37 or a control signal output terminal 38.

Figure 7:
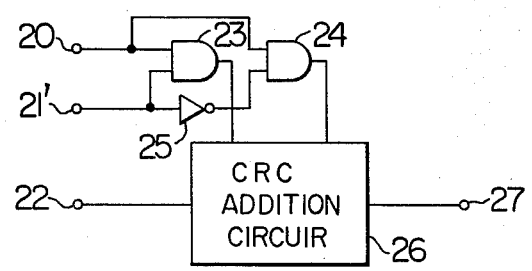

FIGS. 7 and 8 show block diagrams of a third embodiment of the present invention, which applies the basic teaching of the second embodiment shown in FIGS. 5 and 6 and which uses the initial conditions in the second embodiment as independent control information. As described in detail in connection with the second embodiment, the initial conditions established in generating the CRC bits in the reproducing unit are reproduced as they are in the reproducing unit. Accordingly, by replacing the initial condition input terminal 21 and the initial condition output terminal 33 shown in FIGS. 5 and 6 with a control information input terminal 21' and a control information output terminal 33', respectively, the control information superimposed on the CRC bits can be derived from an output terminal 33' in accordance with the operation of the second embodiment without increasing the number of data bits.

FIGS. 9 and 10 show a fourth embodiment of the present invention, in which FIG. 9 shows a block diagram of a recording unit and FIG. 10 shows a block diagram of a reproducing unit. In the fourth embodiment, an initial condition is imparted to each of the CRC bits in the recording unt and it is extracted in the reproducing unit.

In the recording unit shown in FIG. 9, before the data bits are applied to a CRC addition circuit 41 from a data bit input terminal 22, an initialization pulse is applied through an initialization pulse input terminal 20. Initial condition input terminals 40 at this time apply initial conditions for the CRC arithmetic operation to the CRC addition circuit 41. The contents of the bits of the initial conditions are latched in the respective bit positions of the CRC shift register in the CRC addition circuit 41. Thereafter, the data bits are applied from the data bit input terminal 22 to the CRC addition circuit 41 to generate the CRC bits. Upon the completion of the entry of one block of data, the CRC bits are added to the data bits and they are outputted to a record signal output terminal 42 for recording.

In the reproducing unit shown in FIG. 10, before the reproduced signal consisting of the data bits and the CRC bits is received, an initialization pulse is applied to CRC check circuits 44a, 44b, . . . 44n through an initialization pulse input terminal 28. The number of the CRC check circuits 44 provided is equal to the number of initial conditions established, or the number of bits n in the present embodiment. A bit pattern of a first initial condition is latched in the shift register of the first CRC check circuit 44a by the initialization pulse, a bit pattern of a second initial condition is latched in the shift register of the second CRC check circuit 44b and so on, and a bit pattern of an n-th initial condition is latched in the shift register of the n-th CRC check circuit 44n. In this manner, the bit patterns of n different initial conditions which will possibly be transmitted are latched in the shift registers of the n CRC check circuits. Thereafter, the data bits and the CRC bits are applied to the CRC check circuits 44a, 44b, . . . 44n through the signal input terminal 43 and the CRC check circuits effect the CRC check operations. Upon the completion of the entry of the data bits and the CRC bits to the CRC check circuits, if no error has occurred during the transmission, the contents of only those shift registers of the CRC check circuits which have been set to the same bit pattern as the transmitted initial condition bit pattern will be all-"0" but the contents of the other shift registers of the CRC check circuits will not be all-"0." For example, if the first initial condition bit pattern was transmitted, the content of the shift register of the CRC check circuit 44a will be all-"0," which is then applied to an AND gate 45 and a pattern generator 46, but all other CRC check circuits provide "1" outputs to the AND gate 45 and the pattern generator 46. The pattern generator 46 is constructed to produce the initial condition bit pattern for that shift register of the CRC check circuit which is producing the all-"0" output. When the output of the CRC check circuit 44a is "0," it produces the first bit pattern at an initial condition output terminal 48a. In this manner, if no error has occurred, the output of only that CRC check circuit of the n CRC check circuit which is associated with the transmitted initial condition will be "0" and the outputs of all other CRC check circuits will be "1." Accordingly, the pattern generator 46 reproduces the initial conditoin bit pattern and provides it to the initial conditoin output terminal 48a, 48b, . . . or 48n. The AND gate 45 produces a "0" output at an error detection terminal 47.

If an error has occurred during the transmission, the contents of the shift registers of the n CRC check circuits are not all-"0" but all-"1." Thus, the AND gate 45 produces a "1" output at the error detection terminal 47 to indicate the error.

In the embodiment shown in FIGS. 9 and 10, when the CRC bits are to be added to the digital control signal in the recording unit, the CRC bits are generated using a predetermined bit pattern of initial condition, and when the CRC bits are to be added to the sampled signal word which is the digital version of the analog audio signal, the CRC bits are generated with the initial condition being set to a bit pattern other than the predetermined bit pattern. In the reproducing unit, a pattern verifying circuit 49 checkds if the predetermined bit pattern is produced at the initial condition output terminal 48 to discriminate between the data frame and the control signal frame. The reproduced signal applied at a reproducing signal input terminal 43 is supplied to an information extraction circuit 35 to extract only the information signal, which is then supplied to a switching circuit 36, which in turn is switched when the pattern verifying circuit 49 detects a predetermined pattern for the control signal. In this manner, the discrimination information signal is derived at a sampled signal word output terminal 37 or a control signal output terminal 38.

Figure 11:
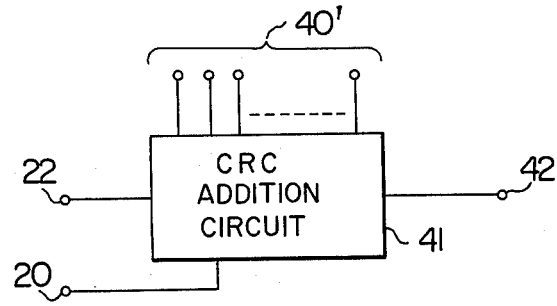
FIGS. 11 and 12 show block diagrams of a recording unit and a reproducing unit, respectively, of a fifth embodiment of the present invention.
Figure 12:
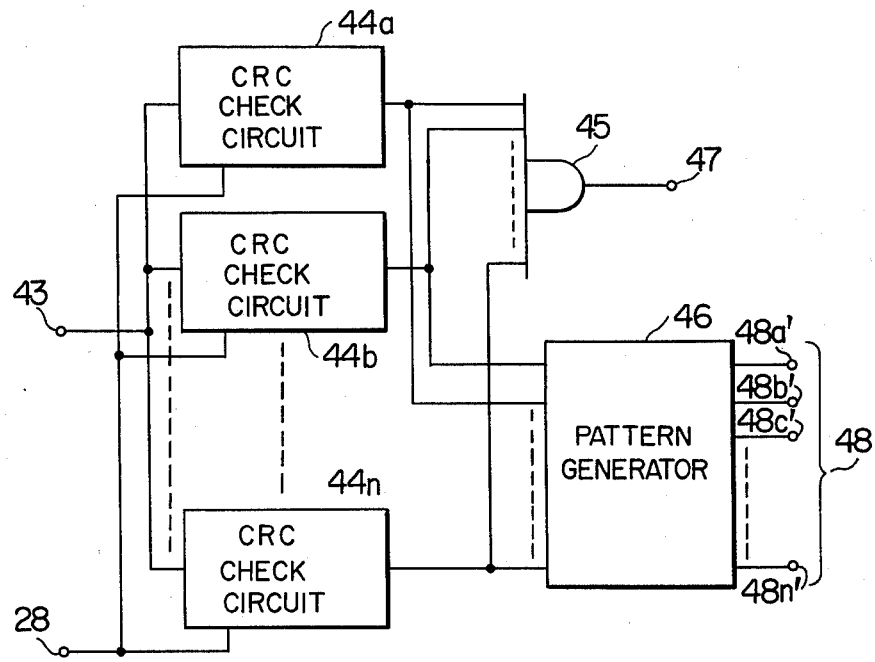

FIGS. 11 and 12 show block diagrams of a fifth embodiment of the present invention which applies the basic teachings of the fourth embodiment shown in FIGS. 9 and 10, and which uses the initial condition bit patterns in the fourth embodiment as independent control information. As described in detail in connection with the fourth embodiment, the initial conditions established in generating the CRC bits in the recording unit are reproduced as they are in the reproducing unit. Accordingly, by replacing the initial condition input terminal 40 and the initial condition output terminal 48 shown in FIGS. 9 and 10 with a control information input terminal 40' and a control information output terminal 48, respectively, the control information superimposed on the CRC bits can be extracted from the output terminal 48' in accordance with the operation of the fourth embodiment without increasing the number of data bits.

As described in detail hereinabove, in accordance with the present invention, the discrimination between the data frame and the control signal frame cna be effected without increasing the transmission rate or recording density, and a PCM recording and reproducing apparatus capable of code error detection by CRC is provided. By extracting the one-bit or multi-bit initial condition used in generating the CRC bits, as the identification information, the initial conditions themselves can be used a second control signals.

What is claimed is:

1. A PCM recording and reproducing apparatus comprising
   (a) code sequence generating means for generating a code sequence having a data frame and a control signal frame,
   said data frame including a sampled signal word which is a digital version of an analog audio signal and a first error detection code generated based on said sampled signal word,
   said control signal frame including a control signal which is a digital version of a system control information and a second error detection code generated based on said control signal,
   said first and second error detection codes being generated under different arithmetic conditions, and
   (b) frame discrimination means receiving said code sequence including said two different types of frames, said discrimination means having an error detection code detecting circuit having arithmetic conditions corresponding to said arithmetic conditions established for generating said first and second error detection codes,
   whereby said data frame and said control signal frame are discriminated from said code sequence.

2. A PCM recording and reproducing apparatus according to claim 1 wherein said first error detection code of said data frame and said second error detection code of said control signal frame are generated using different generator polynomials.

3. A PCM recording and reproducing apparatus according to claim 1 wherein said data frame includes said sampled signal word, a frame synchronizing signal and an error detection code, said control signal frame includes said control signal, a frame synchronizing signal and an error detection signal,
   said error detection codes in said data frame and said control signal frame being generated using the same generator polynomials,
   an information polynomial for one of said two frames representing only information portion of said sampled signal word or said control signal while an information polynomial for the other fram representing said sampled signal word or said control signal, and said frame synchronizing signal.

4. A PCM recording and reproducing apparatus according to claim 3 wherein one of said two error detection codes is generated using an information polynomial representing only the information portion and a first generator polynomial while the other error detection code is generated using an information polynomial representing the information portion and the frame synchronizing signal portion and a second generator polynomial different from said first generator polynomial.

5. A PCM recording and reproducing apparatus according to claim 1 wherein said first error detection code of said data frame and said second error detection code of said control signal frame are generated under different initial arithmetic operation conditions.

6. A PCM recording and reproducing apparatus according to claim 5 wherein one or all bits of said error detection code are used for the initial condition bits.

7. A PCM recording and reproducing apparatus according to claim 5 or 6 wherein said frame discrimination means further includes extraction means for extracting said initial conditions, whereby the initial conditions extracted by said extraction means are used as other control signals.

* * * * *